United States Patent
Nishida et al.

(10) Patent No.: US 7,995,220 B2
(45) Date of Patent: Aug. 9, 2011

(54) IMAGE FORMING APPARATUS

(75) Inventors: Masayoshi Nishida, Ebina (JP); Masahiro Mori, Ebina (JP); Shinji Masaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1165 days.

(21) Appl. No.: 11/374,016

(22) Filed: Mar. 14, 2006

(65) Prior Publication Data

US 2006/0290996 A1 Dec. 28, 2006

(30) Foreign Application Priority Data

Jun. 27, 2005 (JP) ................................ 2005-186141

(51) Int. Cl.
*G06F 15/00* (2006.01)
*G03G 21/18* (2006.01)
*G03G 21/00* (2006.01)

(52) U.S. Cl. .......... 358/1.1; 399/113; 399/114; 399/124

(58) Field of Classification Search .................... 358/1.1, 358/1.9, 1.11–1.18, 1.2, 1.4, 1.5; 399/113, 399/114, 124

See application file for complete search history.

(56) References Cited

U.S. PATENT DOCUMENTS

| 7,346,294 B2 * | 3/2008 | Lee ................................ 399/124 |
| 2003/0161656 A1 * | 8/2003 | Miura et al. ................... 399/116 |
| 2004/0131384 A1 * | 7/2004 | Miyaji et al. ................... 399/124 |

FOREIGN PATENT DOCUMENTS

| JP | A-04-304467 | 10/1992 |
| JP | 7-168487 | 7/1995 |
| JP | 2001-125459 | 5/2001 |
| JP | A-2004-50438 | 2/2004 |
| JP | 2004-102043 | 4/2004 |

\* cited by examiner

*Primary Examiner* — Thierry L Pham

(74) *Attorney, Agent, or Firm* — Morgan, Lewis & Bockius LLP

(57) ABSTRACT

An image forming apparatus that forms an image on a recording paper fed from a paper cassette, the apparatus comprises: a housing that accommodates the paper cassette to be drawn toward the front side of the housing and has an opening in the side surface of the housing; and a lid body including a covering part and a sliding part that slidably supports the covering part, the covering part having a member that covers the opening of the side surface of the housing and projects toward the inner side than the opening, the covering part and the sliding part integrally separating from the opening, and the covering part sliding in parallel to the opening.

5 Claims, 5 Drawing Sheets

IMAGE FORMING APPARATUS

BACKGROUND

1. Technical Field

The present invention relates to an image forming apparatus that forms images on a recording paper fed from a paper cassette.

2. Related Art

Conventionally, image forming apparatuses such as copiers each having a paper cassette that accommodates recording paper and is freely inserted and drawn in front of the apparatus and a lid openable for removing recording paper from a paper transport path when a jam occurs on the side of the apparatus have been known.

Some of such image forming apparatuses utilize the inner side of the lid provided on the side of the apparatus as a base for attaching members for the purpose of addressing downsizing that has been increasingly required in recent years.

However, even when the downsizing is realized by thus attaching members to the inner side of the lid, it is necessary to secure a range in which the lid provided on the side of the apparatus is movable as empty space. As a result, it is likely that the effect of downsizing of the apparatus itself is attenuated because the empty space becomes dead space.

SUMMARY

The present invention has been made in view of the above circumstances and provides an image forming apparatus.

According to an aspect of the invention, an image forming apparatus forms an image on a recording paper fed from a paper cassette, and includes: a housing that accommodates the paper cassette to be drawn toward the front side of the housing and has an opening in the side surface of the housing; and a lid body including a covering part and a sliding part that slidably supports the covering part, the covering part having a member that covers the opening of the side surface of the housing and projects toward the inner side than the opening, the covering part and the sliding part integrally separating from the opening, and the covering part sliding in parallel to the opening

BRIEF DESCRIPTION OF THE DRAWINGS

Embodiments of the invention will be described in detail based on the following figures, wherein.

DETAILED DESCRIPTION

Hereinafter, an embodiment of an image forming apparatus of the invention will be described.

Figure 1:
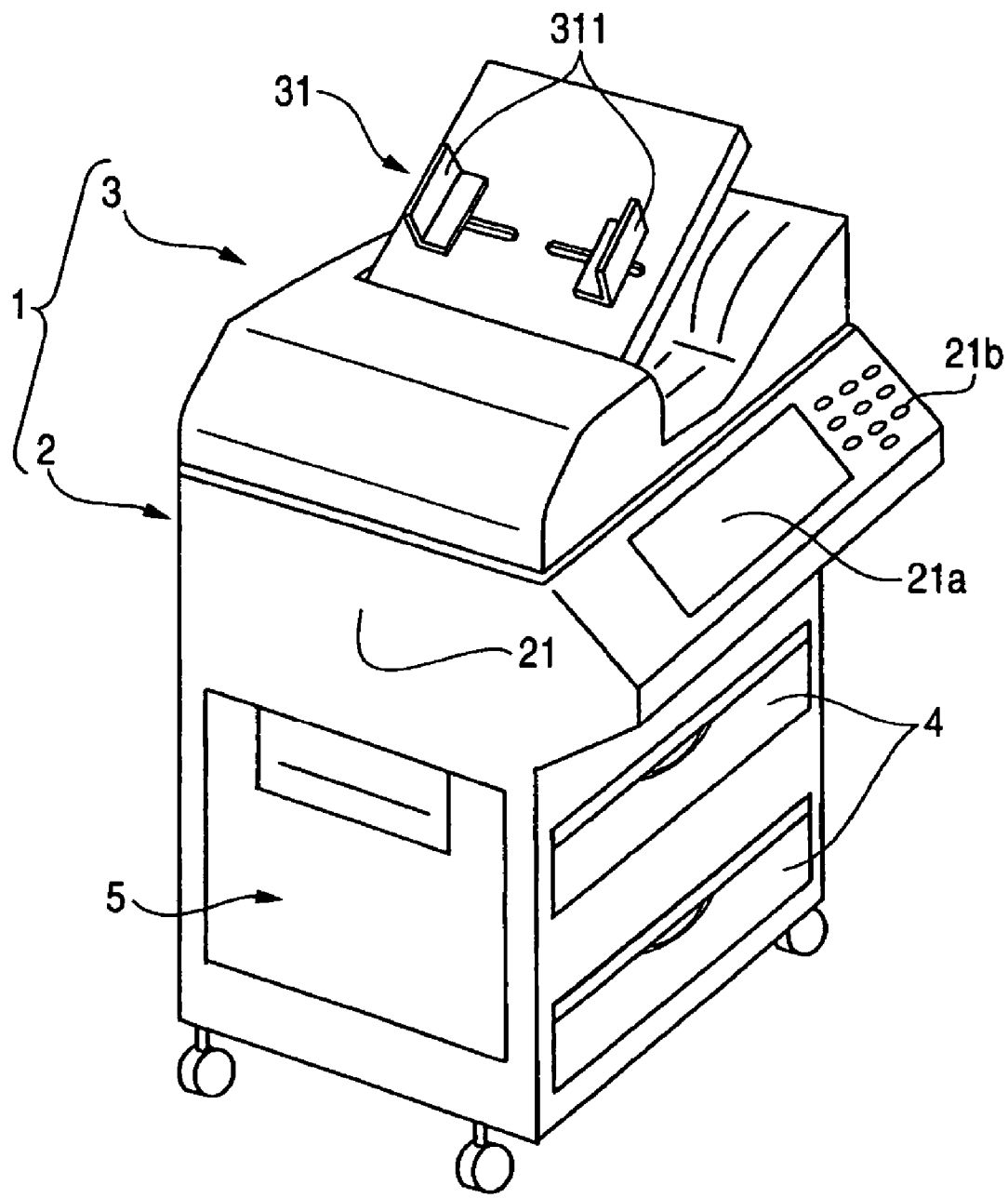
FIG. 1 is a perspective view of an appearance of a copier as one embodiment of an image forming apparatus of the invention.

FIG. 1 is a perspective view of an appearance of a copier as one embodiment of the image forming apparatus of the invention.

A copier 1 shown in FIG. 1 is a copier includes an upper lid part 3 on which an original document receiver 31 is mounted, a base part 2 on which the upper lid part 3 is openably mounted, and two paper cassettes 4 in tiers that accommodate recording paper.

FIG. 1 shows that side guides 311 for sensing the size of an original are mounted on the original document receiver 31 that forms the upper lid part 3, and a touch panel 21a and a numeric keypad 21b for operation are provided to the base part 2.

Further, FIG. 1 shows that the two paper cassettes 4 are housed in tiers in front of a housing 21 of the base part 2, and an inspection lid 5 to be opened when a transport path for transporting recording paper fed from the paper cassettes 4 to an image forming part within the housing 21 is provided on the side of the housing 21.

Figure 2A:
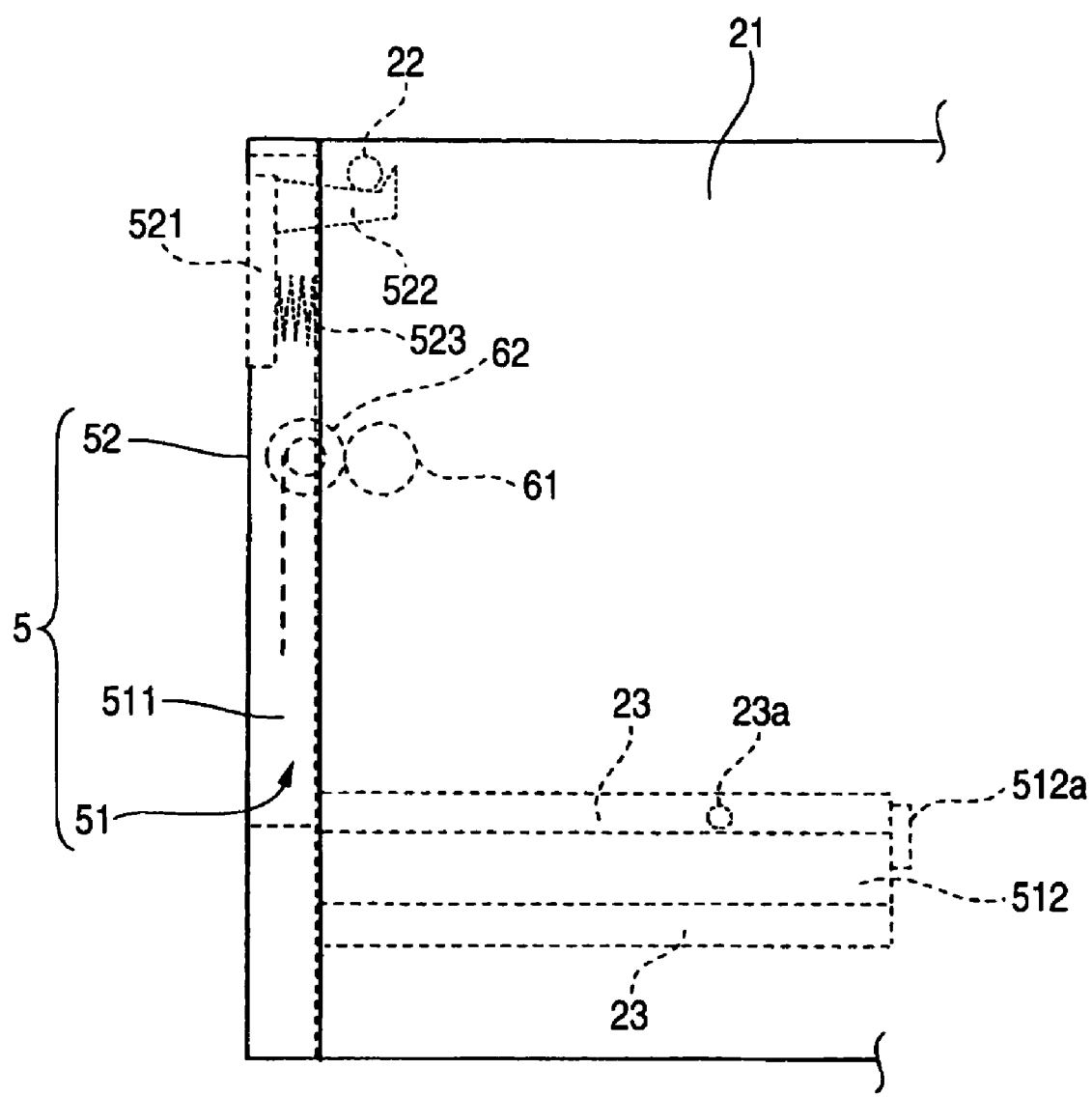
FIGS. 2A and 2B show an opening and closing mechanism of an inspection lid provided on the side surface of a housing of a base part.
Figure 2B:
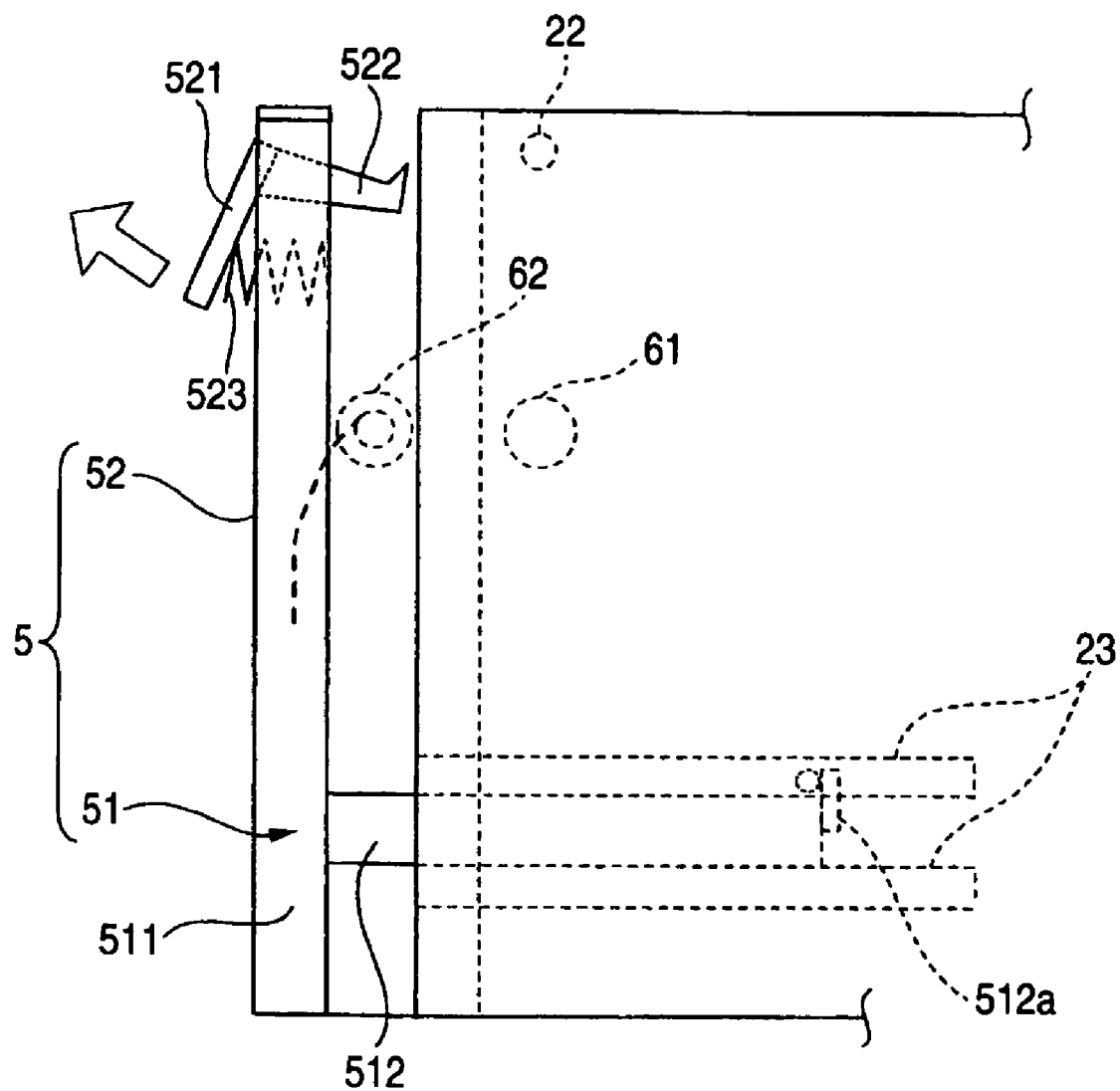

FIGS. 2A and 2B show an opening and closing mechanism of the inspection lid provided on the side of the housing of the base part.

The inspection lid 5 shown in FIGS. 2A and 2B is formed by a frame 51 and a cover 52. A handle 521 is provided on the upper side of the cover 52, the frame 51 is formed by a sliding frame 511 and a separating arm 512, and the cover 52 is slidably fit in the sliding frame.

FIG. 2A shows the case where a state in which the inspection lid 5 is closed is seen in front of the housing, and FIG. 2B shows a state in which the frame 51 and the cover 52 are integrally separated from the side surface of the housing.

As the handle 521 shown on the upper side of the cover 52, the handle 521 to be operated when the inspection lid 5 is once separated from the side surface of the housing is axially attached, and a rock arm 522 extending toward the inner side of the housing is attached to the handle 521. Further, a tension spring 523 is attached between the handle 521 and the cover 52 so that the surface of the handle 521 and the surface of the cover 52 are coplanar when the operator does not operate the handle 521. A rock receiver 22 engaging with the rock arm 522 is provided at the housing side.

Further, a pinch roll 62 forming a pair with a pinch roll 61 provided in the transport path is attached on the inner side of the cover 52, and a state in which the pinch roll 62 attached to the cover 52 hangs toward the housing side when the inspection lid 5 is once separated from the side surface of the housing is shown.

The separating arm 512 is provided on the lower side of the frame 51, and the frame 51 and the cover 52 can be integrally separated from the side surface of the housing by sliding them along the guide of a rail 23 provided in the housing 21. Further, in order to allow the separation between the frame 51 and the cover 52 to fall within a predetermined range, stoppers 512a, 23a are provided to the separating arm 512 and the rail 23, respectively.

FIGS. 3A, 3B, 4A, and 4B show the movement of the inspection lid seen from the side of the apparatus and from above the apparatus. Here, the rock arm 522 attached to the handle 521 is omitted to be shown.

Figure 3A:
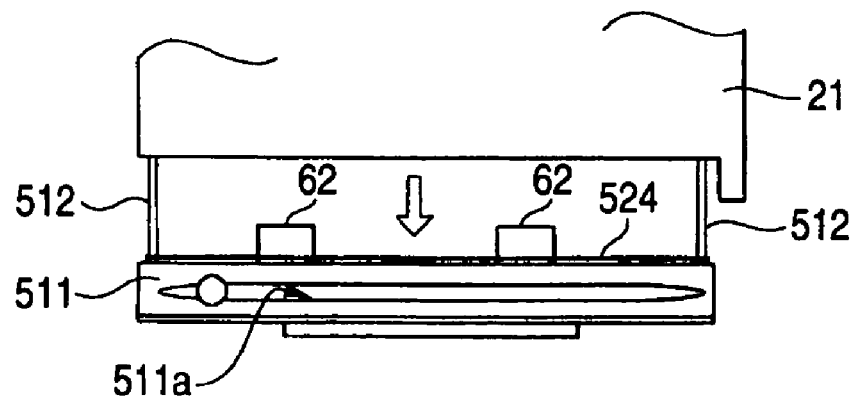
FIGS. 3A and 3B show the movement of the inspection lid seen from the side of the apparatus and from above the apparatus.
Figure 3B:
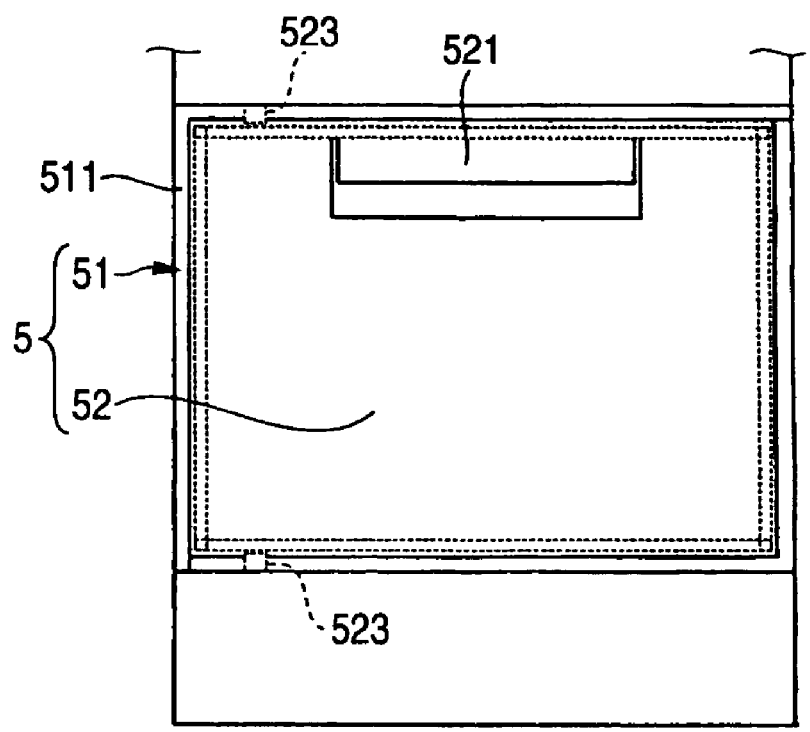

FIGS. 3A and 3B show a state in which the inspection lid 5 is once separated from the side surface of the housing seen from the side of the apparatus and from above the apparatus.

Long slots 511a that slidably and idly fit bosses 523 attached to the upper and lower surfaces of the cover 52 are provided on the upper and lower surfaces of the sliding frame 511 as a component element of the frame 51, and thereby, the cover 52 is movable to the front side of the apparatus. FIG. 3A also shows that the separating arm 512, the pinch roll 62, and a packing 524 for preventing sound within the housing from leaking out are attached to the periphery of the inner side of the cover.

Figure 4A:
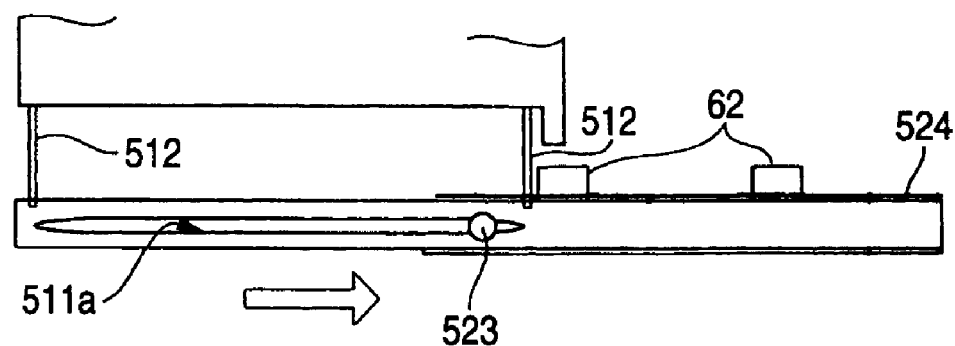
FIGS. 4A and 4B show the movement of the inspection lid seen from the side of the apparatus and from above the apparatus.
Figure 4B:
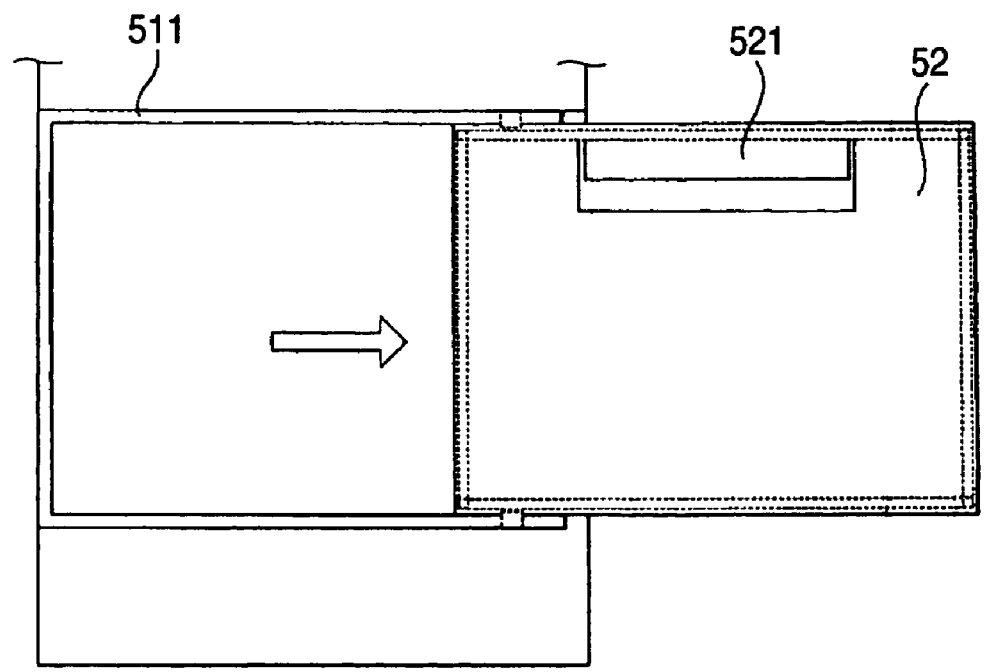

FIGS. 4A and 4B show a state in which, after the frame 51 and the cover 52 are integrally separated from the side surface of the housing, the cover 52 exits from the sliding frame 511 and slides toward the front side of the apparatus.

FIG. 4A shows that the boss 523 attached to the upper and lower surfaces of the cover 52 moves to the right side than that shown in FIG. 3A by the sliding of the cover 52.

As described above, in the copier 1 of the embodiment, it is required only that the empty space is secured for separating the inspection lid 5 formed by the frame 51 and the cover 52 having the pinch roller 62 within to the degree that the pinch roller 62 does not interfere with the side surface of the housing, and further, the cover 52 is then slid toward the front side of the apparatus originally so that an operator stands there and draws the paper cassettes 4.

Furthermore, in the copier 1, the inspection lid 5 is separated from the side surface of the housing and then slides toward the front side of the housing. and the packing 524 may be attached to the inner periphery of the cover 52.

In the above described embodiment, the case where the cover 52 once separated from the side surface of the housing is slid toward the front side of the housing has been described as an example, however, the invention is not limited to that, but the cover 52 once separated from the side surface of the housing is slid upward of the housing. Further, in the embodiment, the case where the packing 524 is attached to the inner periphery of the cover has been described as an example, however, no packing may be attached in the invention. Furthermore, the case where the pinch roll 62 is attached to the inner side of the cover 52 as an example, however, the member to be attached is not limited to that in the invention.

As described above, some embodiments of the invention are outlined below.

According to an aspect of the invention, an image forming apparatus that forms an image on a recording paper fed from a paper cassette includes: a housing that accommodates the paper cassette to be drawn toward the front side of the housing and has an opening in the side surface of the housing; and a lid body including a covering part and a sliding part that slidely supports the covering part, the covering part having a member that covers the opening of the side surface of the housing and projects toward the inner side than the opening, the covering part and the sliding part integrally separating from the opening, and the covering part sliding in parallel to the opening.

In the image forming apparatus, it is required only that empty space is secured for integrally separating the covering part and the sliding part having the member within by the subsequent sliding movement to the degree that the member does not interfere with the side surface of the housing, and further, the covering part is slid in parallel to the opening toward the front side of the apparatus originally so that an operator stands there and draws the paper cassette.

Here, a packing intervening between the housing and lid body may be provided.

The image forming apparatus may include the covering part that is once separated from the side surface of the housing where the opening is provided and slides in parallel to the opening and the packing may be between the housing and the lid body.

Furthermore, the member of the housing that projects toward the inner side than the opening may be a member that serves to transport paper fed from the paper cassette.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-186141 filed on Jun. 27, 2005 including specification, claims, drawings and abstract is incorporated herein by reference in its entirety.

What is claimed is:

1. An image forming apparatus that forms an image on a recording paper fed from a paper cassette, the apparatus comprising:
   a housing that accommodates the paper cassette to be drawn toward the front side of the housing and has an opening in the side surface of the housing; and
   a lid body including a covering part that covers the opening of the side surface of the housing and a sliding part that slidably supports the covering part,
   the covering part having a member that projects toward the inner side than the opening,
   the covering part and the sliding part integrally separating from the opening in a first direction, and the covering part sliding along the sliding part in parallel to the opening and in a second direction, when the lid body opens the opening from a state in which the lid body covers the opening of the side surface of the housing, the first direction being different from the second direction,
   the covering part is allowed a sliding movement to the sliding part at the time the member is exposed from the opening; and further comprising:
   a stopper regulating a distance between the housing and the lid body,
   wherein the covering part is allowed the sliding movement of the sliding part when the stopper regulates the distance, and the distance is a distance of degree in which the member does not interfere with the side surface of the housing at the time of the sliding movement.

2. The image forming apparatus according to claim 1, further comprising a packing between the housing and the lid body.

3. The image forming apparatus according to claim 1, wherein the member transports the recording paper fed from the paper cassette.

4. The image forming apparatus according to claim 1, wherein one side of the covering part in the state of separating from the opening is parallel to the one side of the covering part in the state of sliding along the sliding part.

5. The image forming apparatus according to claim 1, wherein the first direction is perpendicular to the second direction.

* * * * *